United States Patent
Zhou et al.

(10) Patent No.: US 11,259,029 B2
(45) Date of Patent: Feb. 22, 2022

(54) METHOD, DEVICE, APPARATUS FOR PREDICTING VIDEO CODING COMPLEXITY AND STORAGE MEDIUM

(71) Applicant: Beijing Baidu Netcom Science and Technology Co., Ltd., Beijing (CN)

(72) Inventors: Zhichao Zhou, Beijing (CN); Dongliang He, Beijing (CN); Fu Li, Beijing (CN); Xiang Zhao, Beijing (CN); Xin Li, Beijing (CN); Zhizhen Chi, Beijing (CN); Xiang Long, Beijing (CN); Hao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 92 days.

(21) Appl. No.: 16/797,911

(22) Filed: Feb. 21, 2020

(65) Prior Publication Data
US 2020/0374526 A1    Nov. 26, 2020

(30) Foreign Application Priority Data
May 23, 2019   (CN) .......................... 201910432470.8

(51) Int. Cl.
*H04N 19/14*   (2014.01)
*H04N 19/12*   (2014.01)
*H04N 19/625*  (2014.01)
*G06N 3/08*    (2006.01)

(52) U.S. Cl.
CPC .............. *H04N 19/14* (2014.11); *G06N 3/08* (2013.01); *H04N 19/12* (2014.11); *H04N 19/625* (2014.11)

(58) Field of Classification Search
CPC ...... H04N 19/14; H04N 19/12; H04N 19/625; G06N 3/08

USPC .................................................... 375/240.12
See application file for complete search history.

(56) References Cited

U.S. PATENT DOCUMENTS

2003/0185442 A1    10/2003   Yang et al.

FOREIGN PATENT DOCUMENTS

| CN | 1992898   A | 7/2007 |
|----|-------------|--------|
| CN | 103079065  A | 5/2013 |
| CN | 103618906  A | 3/2014 |
| CN | 108174290  A | 6/2018 |

OTHER PUBLICATIONS

Office Action dated Sep. 30, 2020 issued in connection with corresponding Chinese Patent Application No. 201910432470.8.
Search Report dated Sep. 22, 2020 issued in connection with corresponding Chinese Patent Application No. 201910432470.8.

*Primary Examiner* — Nguyen T Truong
(74) *Attorney, Agent, or Firm* — Akerman LLP (57) ABSTRACT

A method, device, apparatus for predicting a video coding complexity and a computer-readable storage medium are provided. The method includes: acquiring an attribute feature of a target video; extracting a plurality of first target image frames from the target video; performing a frame difference calculation on the plurality of the first target image frames, to acquire a plurality of first frame difference images; determining a histogram feature for frame difference images of the target video according to a statistical histogram of each first frame difference image; and inputting a plurality of features of the target video into a coding complexity prediction model to acquire a coding complexity prediction value of the target video. Through the above method, the BPP prediction value can be acquired intelligently.

17 Claims, 8 Drawing Sheets

METHOD, DEVICE, APPARATUS FOR PREDICTING VIDEO CODING COMPLEXITY AND STORAGE MEDIUM

CROSS-REFERENCE TO RELATED APPLICATION

This application is based on and claims the benefit of Chinese patent application No. 201910432470.8, entitled "Method, Device, Apparatus for Predicting Video Coding Complexity and Storage Medium" and filed on May 23, 2019, which is incorporated by reference herein in its entirety.

TECHNICAL FIELD

The present application relates to a field of video processing technology, and in particular, to a method, device, apparatus for predicting a video coding complexity and a computer-readable storage medium.

BACKGROUND

At present, video has occupied a large part of internet traffic and has become one kind of main media for people to obtain information. Compared to other kinds of multimedia, such as a text and an image, video is often richer in content and more intuitive, but more storage space and higher bandwidth are required to store and transmit video. A coding complexity of an original video can be predicted and a suitable transcoding strategy can be developed according to the complexity, in order to ensure a video quality and efficient transcoding compression for the video, thereby saving a video distribution bandwidth.

In the existing scheme for predicting a coding complexity, the coding complexity of the original video is obtained by performing a fast transcoding operation on the original video. The transcoding process involves two steps of decoding and encoding, which is time consuming and seriously affects an efficiency of the entire video compression process. Further, a transcoding parameter needs to be set manually during transcoding. Due to an uncertainty in setting the transcoding parameter, an accuracy of the coding complexity is affected.

SUMMARY

A method, a device, and an apparatus for predicting a video coding complexity, as well as a computer-readable storage medium are provided according to embodiments of the present application, so as to at least solve the above technical problems in the existing technology.

According to a first aspect, a method for predicting a video coding complexity includes:

acquiring an attribute feature of a target video;

extracting a plurality of first target image frames from the target video;

performing a frame difference calculation on the multiple the first target image frames, to acquire a plurality of first frame difference images;

determining a histogram feature for frame difference images of the target video according to a statistical histogram of each first frame difference image; and inputting a plurality of features of the target video into a coding complexity prediction model to acquire a coding complexity prediction value of the target video, wherein the multiple features of the target video comprise the attribute feature of the target video and the histogram feature for frame difference images of the target video.

In one implementation, the extracting a plurality of first target image frames from the target video comprises:

extracting V image frames from the target video according to a preset frames per second;

dividing the V image frames into N segments of image stream according to a playing sequence the V image frames in the target video; and extracting K image frames from each segment of image stream to acquire the multiple first target image frames; wherein, V, N, and K are positive integers, and K is less than V.

In one implementation, the performing a frame difference calculation on the multiple first target image frames, to acquire a plurality of first frame difference images comprises:

performing the frame difference calculation on two adjacent image frames of the K image frames in each segment of image stream, to acquire a first frame difference image.

In one implementation, the determining a histogram feature for frame difference images of the target video according to a statistical histogram of each first frame difference image comprises:

drawing a statistical histogram for each first frame difference image to acquire a plurality of histogram vectors for respective frame difference images; and averaging the multiple histogram vectors to acquire the histogram feature of the frame difference images.

In one implementation, the multiple features of the target video further comprise a transforming histogram feature, and the method further comprises:

performing a discrete cosine transform for each of the first frame difference images to acquire a plurality of spectrograms for respective first frame difference images;

drawing a statistical histogram for each spectrogram to acquire a plurality of histogram vectors for respective spectrograms; and averaging the multiple histogram vectors for the respective spectrograms to acquire the transforming histogram feature.

In one implementation, plurality of features of the target video further comprise an image depth feature and a frame difference depth feature, and the method further comprises:

inputting a plurality of second target image frames extracted from the target video into an image deep learning model;

acquiring an intermediate layer result of the image deep learning model in response to an input of the multiple frames of second target image, to acquire the image depth feature;

performing a frame difference calculation on the multiple third target image frames extracted from the target video, to acquire a plurality of second frame difference images;

inputting the multiple second frame difference images into a frame difference deep learning model; and acquiring an intermediate layer result of the frame difference deep learning model in response to an input of the multiple second frame difference images, to acquire the frame difference depth feature.

In one implementation, the method further includes:

extracting a plurality of sample image frames from a first sample video; and training a temporal segment network by using the multiple sample image frames as inputs and using a true value of the coding complexity of the first sample video as a target, to acquire the image deep learning model.

In one implementation, the method further includes:

extracting a plurality of sample image frames from a first sample video;

performing a frame difference calculation on the multiple sample image frames, to acquire a plurality of sample frame difference images; and training a temporal segment network by using the multiple sample frame difference images as inputs and using a true value of the coding complexity of the first sample video as a target, to acquire the frame difference deep learning model.

In one implementation, the inputting a plurality of second target image frames extracted from the target video into an image deep learning model comprises:

extracting V image frames from the target video according to a preset frames per second, wherein V is a positive integer;

dividing the V image frames into N segments of image stream according to a playing sequence of the V image frames in the target video;

extracting one image frame from each segment of image stream, to acquire N second target image frames; and inputting the N second target image frames into the image deep learning model.

In one implementation, the performing a frame difference calculation on the multiple third target image frames extracted from the target video, to acquire a plurality of second frame difference images comprises:

extracting V image frames from the target video according to a preset frames per second, wherein V is a positive integer;

dividing the V image frames into N segments of image stream according to a playing sequence of the V image frames in the target video; and extracting two image frames from each segment of image stream and calculating a frame difference between the two image frames of each segment of image stream, to acquire N second frame difference images.

In one implementation, the target video comprises a second sample video; and during training the coding complexity prediction model, inputting a plurality of features of the target video into a coding complexity prediction model to acquire a coding complexity prediction value of the target video comprises:

inputting features of a plurality of second sample videos into a multi-layer perception model to acquire a plurality of coding complexity prediction values of the respective second sample videos; and according to a plurality of coding complexity true values and the multiple coding complexity prediction values, adjusting the multi-layer perception model to acquire the coding complexity prediction model.

In one implementation, the method further includes:

transcoding the second sample video according to a preset coding parameter; and calculating a coding complexity value of the transcoded second sample video to acquire the coding complexity true value.

According to a second aspect, a device for predicting a video coding complexity is provided, including:

a first acquiring module configured to acquire an attribute feature of a target video;

an extracting module configured to extract a plurality of first target image frames from the target video;

a first calculating module configured to perform a frame difference calculation on the plurality of the first target image frames, to acquire a plurality of first frame difference images;

a first feature determining module configured to determine a histogram feature for frame difference images of the target video according to a statistical histogram of each first frame difference image; and a predicting module configured to input a plurality of features of the target video into a coding complexity prediction model to acquire a coding complexity prediction value of the target video, wherein the plurality of features of the target video comprise the attribute feature of the target video and the histogram feature for frame difference images of the target video.

In one implementation, the plurality of features of the target video further comprise a transforming histogram feature, the device further comprises:

a transforming module configured to perform a discrete cosine transform for each of the first frame difference images to acquire a plurality of spectrograms for respective first frame difference images;

a vector acquiring module configured to draw a statistical histogram for each spectrogram to acquire a plurality of histogram vectors for respective spectrograms; and an averaging module configured to average the plurality of histogram vectors for the respective spectrograms to acquire the transforming histogram feature.

In one implementation, the plurality of features of the target video further comprises an image depth feature and a frame difference depth feature, and the device further comprises:

a first inputting module configured to input a plurality of second target image frames extracted from the target video into an image deep learning model;

a second acquiring module configured to acquire an intermediate layer result of the image deep learning model in response to an input of the plurality of frames of second target image, to acquire the image depth feature;

a second calculating module configured to perform a frame difference calculation on the plurality of third target image frames extracted from the target video, to acquire a plurality of second frame difference images;

a second inputting module configured to input the plurality of second frame difference images into a frame difference deep learning model; and a third acquiring module configured to acquire an intermediate layer result of the frame difference deep learning model in response to an input of the plurality of second frame difference images, to acquire the frame difference depth feature.

In one implementation, the target video comprises a second sample video, during training the coding complexity prediction model, the predicting module comprises:

an inputting sub-module configured to input features of a plurality of second sample videos into a multi-layer perception model to acquire a plurality of coding complexity prediction values of the respective second sample videos; and an adjusting sub-module configured to, according to a plurality of coding complexity true values and the plurality of coding complexity prediction values, adjust the multi-layer perception model to acquire the coding complexity prediction model.

In one implementation, the device further includes:

a transcoding module configured to transcode the second sample videos according to a preset coding parameter; and a third calculating module configured to calculate a coding complexity value of the transcoded second sample video to acquire the coding complexity true value.

In a third aspect, an apparatus for predicting a video coding complexity is provided according to an embodiment of the present application. The functions of the apparatus may be implemented by hardware, or by hardware executing corresponding software. The hardware or software includes one or more modules corresponding to the above functions.

In a possible implementation, the apparatus for predicting a video coding complexity includes a processor and a storage, the storage is configured to store a program for supporting the above method for predicting a video coding complexity executed by the apparatus for predicting a video coding complexity, the processor is configured to execute the program stored in the storage. The apparatus for predicting a video coding complexity further includes a communication interface configured for communication between the apparatus for predicting a video coding complexity and another apparatus or communication network.

In a fourth aspect, a computer-readable storage medium is provided for storing computer software instructions used by the apparatus for predicting a video coding complexity, the computer software instructions include programs involved in execution of the above method for predicting a video coding complexity.

In the method for predicting a video coding complexity according to the embodiments of the application, a BPP prediction value is acquired by inputting the attribute feature of the target video and the histogram feature for the frame difference images of the target video into the coding complexity prediction model, so that the acquired BPP prediction value is more accurate and the prediction is more intelligent.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed according to the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
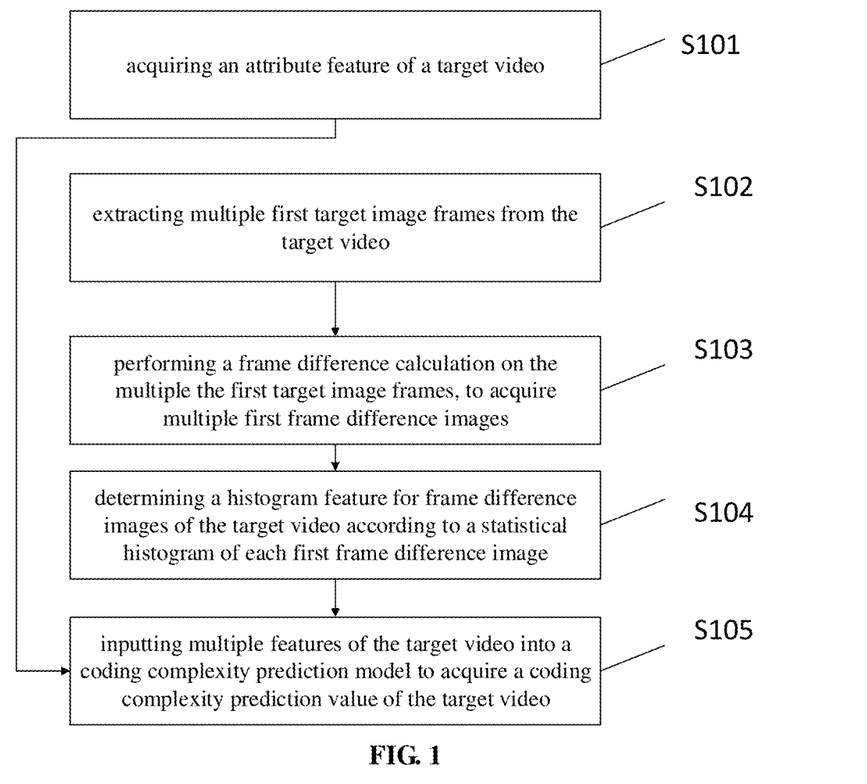
FIG. 1 shows a flowchart of a method for predicting a video coding complexity according to an embodiment of the present application.

FIG. 1 shows a flowchart of a method for prediction a video coding complexity according to an embodiment of the present application. As shown in FIG. 1, the method includes steps from S101 to S105.

S101, acquiring an attribute feature of a target video.

The target video may act as a video object to be transcoded. By acquiring a coding complexity prediction value of the target video, a suitable transcoding strategy is developed according to the coding complexity prediction value to perform transcoding and compression. The target video can also be a video used to train a coding complexity prediction model.

In this embodiment, the coding complexity can be represented by bit per pixel (BPP). For example, the coding complexity prediction value can be represented by a BPP prediction value, and a coding complexity true value can be represented by a BPP true value. Both the BPP prediction value and the BPP true value can be a real number between 0 and 350 (including an endpoint value).

The attribute feature may be a video basic information feature, such as a video duration, a frame length (a length of each frame), a frame width (a width of each frame), frames per second (fps), a BPP calculation value, a time complexity (also known as temporal perceptual information, TI) and a spatial complexity (also known as spatial perception information, SI). In the embodiment, a BPP calculation value of the target video can be calculated by using a formula BPP=size of a disk space occupied by the target video/[(frame length*frame width)*frame number], wherein the frame number=video duration*frames per second.

S102, extracting multiple first target image frames from the target video.

An extraction strategy of the first target image frames may be determined according to actual needs. For example, a uniform extraction strategy may be used to uniformly extract the multiple first target image frames from the target video. In an example, the uniform extraction strategy may be performed by: extracting V image frames from the target video according to a preset frames per second; dividing the V image frames into N segments of image stream according to a playback order of the target video; and extracting K image frames from each segment of the image streams as the multiple frames of the first target image; where V, N, and K are positive integers, and K is less than V.

In an example, the V image frames may be extracted from the target video at 10 fps (i.e., 10 image frames per second);

the acquired V image frames are divided equally into the N segments of image stream according to the playing sequence of V image frames in the target video. For example, the first image frame, the second image frame, the third image frame, . . . , the V/N image frame can be used as the first segment of image stream, Previous K image frames are retained in each segment of the image stream, and the acquired N*K image frames can be used as the multiple first target image frames for extracting the feature of the target video.

S103, performing a frame difference calculation on the multiple the first target image frames, to acquire multiple first frame difference images.

Figure 2:
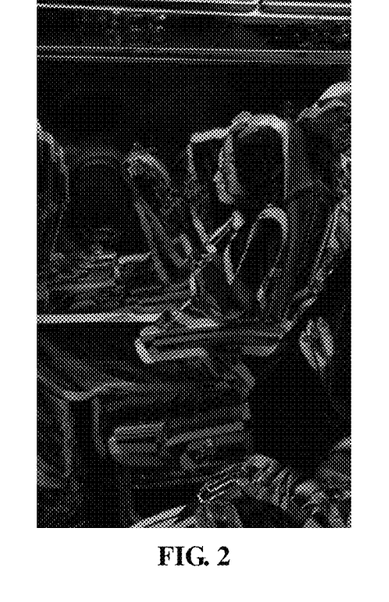
FIG. 2 shows a schematic diagram of one of a first frame difference image in an embodiment according to an embodiment of the present application.

For the extracted multiple first target image frames, a frame difference calculation can be performed on two of the multiple first target image frames, thereby acquiring the multiple first frame difference images. In an embodiment, the frame difference calculation may be performed separately on two adjacent image frames of the K image frames in each segment of image stream to acquire the multiple first frame difference images. For example, the frame difference calculation is performed on two consecutive image frames of the first target image frames in the same segment of the image stream, and N*(K−1) first frame difference images are acquired. FIG. 2 shows a schematic diagram of a first frame difference image acquired by performing a frame difference calculation on two first target image frames in the embodiment. In FIG. 2, the first frame difference image is represented by its grayscale graph.

S104, determining a histogram feature for frame difference images of the target video according to a statistical histogram of each first frame difference image.

The statistical histogram is one kind of statistical report graphs. For example, in the case that a certain physical quantity is measured n times under an identical condition, a series of measurements are acquired. The maximum and minimum measurements can be determined from the series of measurements and then an interval including all measurements is determined. The interval is divided into multiple cells, and a number of measurements falling into each cell is counted. By taking the measurements as an abscissa and the frequency for each cell as an ordinate, each cell and a frequency height for the cell may be drawn to acquire a rectangular graph, that is, the statistical histogram.

In an embodiment, the S104 may include: drawing a statistical histogram for each first frame difference image to acquire multiple histogram vectors for respective frame difference images; and averaging the multiple histogram vectors to acquire the histogram feature of the frame difference images. For example, a 256-dimensional statistical histogram is calculated for each of the first frame difference images to acquire multiple 256-dimensional histogram vectors of the respective frame difference images. Then, the acquired 256-dimensional histogram vectors may be averaged to acquire one 256-dimensional histogram vector for the frame difference images. The one 256-dimensional histogram vector for the frame difference images can be used as the histogram feature for frame difference images of the target video.

Figure 3:
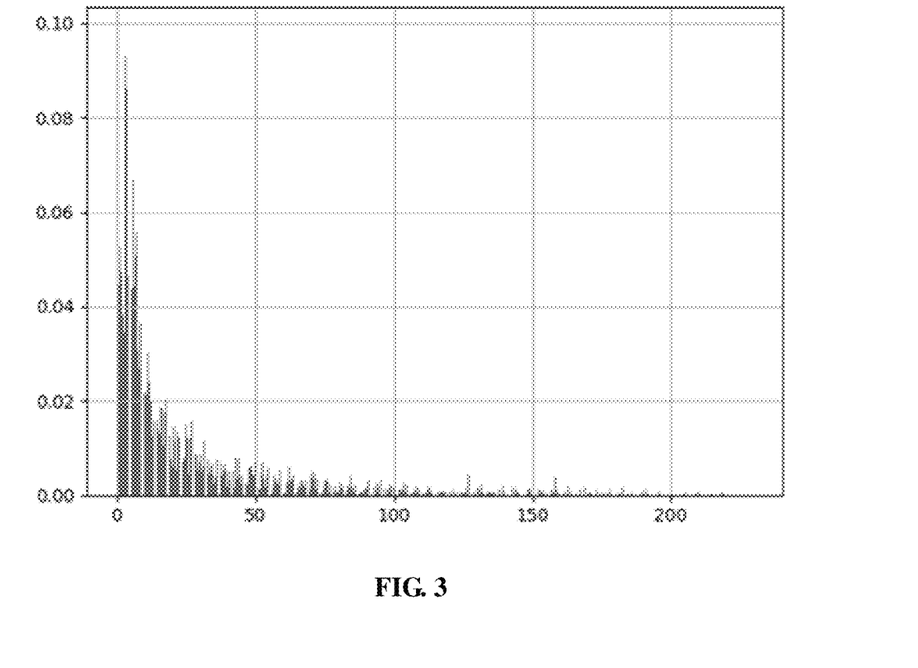
FIG. 3 shows a schematic diagram of a statistical histogram of one of the frame difference images in one example according to an embodiment of the present application.

FIG. 3 shows a diagram of a statistical histogram of one of the first frame difference images in the embodiment. A horizontal axis can be used to represent a certain dimension of the histogram vector for the frame difference image, and the vertical axis can be used to represent a value of the dimension. For example, the first frame difference image may be divided into 256 intervals according to a value range, and each interval is one-dimensional. For each first frame difference image, a statistical histogram is drawn according to the divided intervals to acquire the 256-dimensional histogram vector of the frame difference image.

S105, inputting multiple features of the target video into a coding complexity prediction model to acquire a coding complexity prediction value of the target video, wherein the multiple features of the target video comprise the attribute feature of the target video and the histogram feature for frame difference images of the target video.

Figure 4:
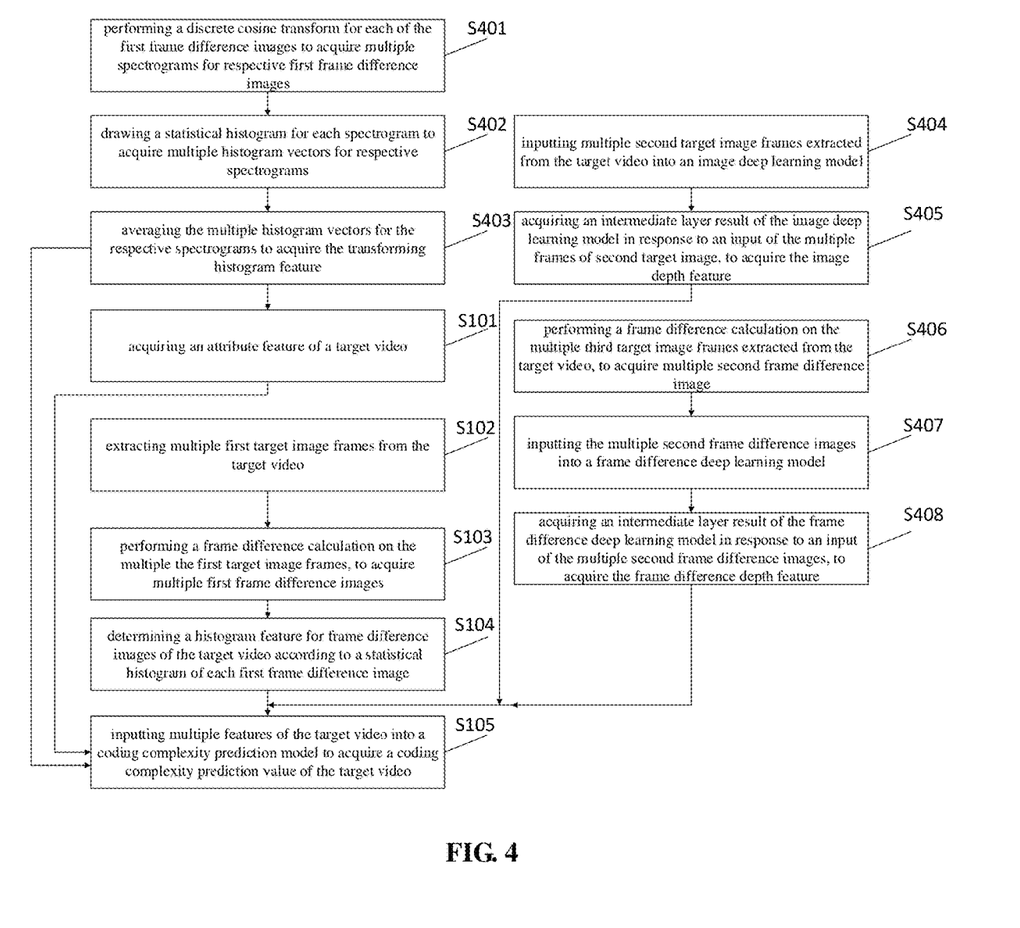
FIG. 4 shows a flowchart of a method for predicting a video coding complexity in an implementation according to an embodiment of the present application.

In an embodiment, the multiple features of the target video further include a transforming histogram feature. As shown in FIG. 4, the method for predicting a video coding complexity in the embodiment may further include:

S401, performing a discrete cosine transform for each of the first frame difference images to acquire multiple spectrograms for respective first frame difference images;

S402, drawing a statistical histogram for each spectrogram to acquire multiple histogram vectors for respective spectrograms; and S403, averaging the multiple histogram vectors for the respective spectrograms to acquire the transforming histogram feature.

The discrete cosine transform (DCT) is a transform related to the Fourier transform. DCT is similar to a discrete Fourier transform, but only real numbers may be used. A result of the DCT can be represented by the spectrogram. In an example, each first frame difference image may be separately subjected to the DCT to acquire the multiple spectrograms. Then, a 266-dimensional statistical histogram is obtained for each spectrogram to acquire the multiple 266-dimensional histogram vectors of a spectrogram. Next, the acquired 266-dimensional histogram vectors of the spectrograms are averaged to acquire one 266-dimensional histogram vector of the spectrogram. The 266-dimensional histogram vector of the spectrogram as averaged can be used as the transforming histogram feature of the target video.

In an embodiment, the feature of the target video may further include an image depth feature and a frame difference depth feature. As shown in FIG. 4, the method for predicting a video coding complexity in the embodiment may further include:

S404, inputting multiple second target image frames extracted from the target video into an image deep learning model.

The image deep learning model can be acquired by training a temporal segment networks (TSN) model. The TSN model may be the TSN model with a second generation convolutional neural network (Shuffle Net v2) as a basic network.

In an embodiment, multiple first sample image frames, which are extracted from a first sample video, may be input into the TSN model. The TPN model is trained by using the BPP true value of the first sample video as a training target. Therefore, the TSN model is trained in this way based on a large number of the first sample videos, and the trained TSN model is used as the image deep learning model. Herein, the first sample image may be a red, green, blue (RGB) image.

The BPP true value of the first sample video may be acquired by: transcoding the first sample video according to a preset coding parameter, and calculating a complexity value of the transcoded first sample video to acquire the true value of the coding complexity.

In an embodiment, in S404, the method may include: extracting V image frames from the target video according to a preset frames per second, wherein V is a positive integer; dividing the V image frames into N segments of image stream according to a playing sequence of the V image frames in the target video; extracting one image frame from each segment of image stream, to acquire N second target image frames; and inputting the N second target image frames into the image deep learning model. In one example, the second target image may be extracted based on the multiple segments of image stream acquired in the foregoing example. For example, one image is extracted from each segment of image stream to obtain the N image frames, and the N image frames can be used as the second target images of the target video, and can be input into the image deep learning model.

S405, acquiring an intermediate layer result of the image deep learning model in response to an input of the multiple frames of second target image, to acquire the image depth feature.

In one example, an output of a last fully-connected layer of the TSN model may be taken as the image depth feature of the target video after inputting the second target image. The image depth feature may have 1024 dimensions.

S406, performing a frame difference calculation on the multiple third target image frames extracted from the target video, to acquire multiple second frame difference images.

In an embodiment, in S406, the method may include: extracting V image frames from the target video according to a preset frames per second, where V is a positive integer; dividing the V image frames into N segments of image stream according to a playing sequence of the V image frames in the target video; extracting one image frame from each segment of image stream, to acquire N second target image frames and inputting the N second target image frames into the image deep learning model. In one example, the third target images may be extracted based on the multiple segments of the image stream acquired in the foregoing example. For example, two consecutive image frames in each segment of the image stream can used to perform the frame difference calculation on the two consecutive image frames, to acquire the N second frame difference images.

S407, inputting the multiple second frame difference images into a frame difference deep learning model.

The frame difference deep learning model can be acquired by training the TSN model. In an embodiment, the frame difference calculated may be performed on two frames of second sample image in multiple frames of the second sample image extracted from the first sample video, to acquire multiple sample frame difference images. The method for performing the frame difference calculation on the multiple frames of the second sample image may be made with reference to the method for performing the frame difference calculation on the multiple frames of the first target image in S103. Further, the multiple sample frame difference images of the first sample video may be input into the TSN model, and the TPN model is trained by using the BPP true value of the first sample video as a target. The TSN model is trained in this way based on a large number of first sample videos, and the trained TSN model is used as a frame difference deep learning model. Both the second sample image and the sample frame difference image may be a RGB image.

S408, acquiring an intermediate layer result of the frame difference deep learning model in response to an input of the multiple second frame difference images, to acquire the frame difference depth feature.

In one example, an output of the last fully-connected layer of the TSN model may be taken as the frame difference depth feature of the target video after inputting the second frame difference images. The frame difference depth feature may have 1024 dimensions.

In one example, during training the TSN model described above, a mean-variance loss can be used as a loss function, and a parameter can be learned by using a back propagation algorithm.

In the embodiment, the target video may include a second sample video. The coding complexity prediction model may be acquired based on a multi-layer perception (MLP) model. In an embodiment, the method for training the coding the complexity prediction model may include: inputting features of multiple second sample videos into a multi-layer perception model to acquire multiple coding complexity prediction values of the respective second sample videos; and according to multiple coding complexity true values and the multiple coding complexity prediction values, adjusting the multi-layer perception model to acquire the coding complexity prediction model.

The BPP true value of the second sample video may be acquired by: transcoding the second sample video according to a preset coding parameter; and calculating a coding complexity value of the transcoded second sample video to acquire the coding complexity true value. It should be noted that, in the embodiment, the first sample video and the second sample video may also be selected from the same video, respectively, to train different models.

The feature of the second sample video may include multiple or all of the attribute feature of the second sample video, the frame difference histogram feature, the transforming histogram feature, the image depth feature, and the frame difference depth feature. In the embodiment, the attribute feature of the second sample video, the frame difference histogram feature, the transforming histogram feature, the image depth feature, and the frame difference depth feature may be acquired with reference to the foregoing embodiments, since the target video may include the second sample video.

Figure 5:
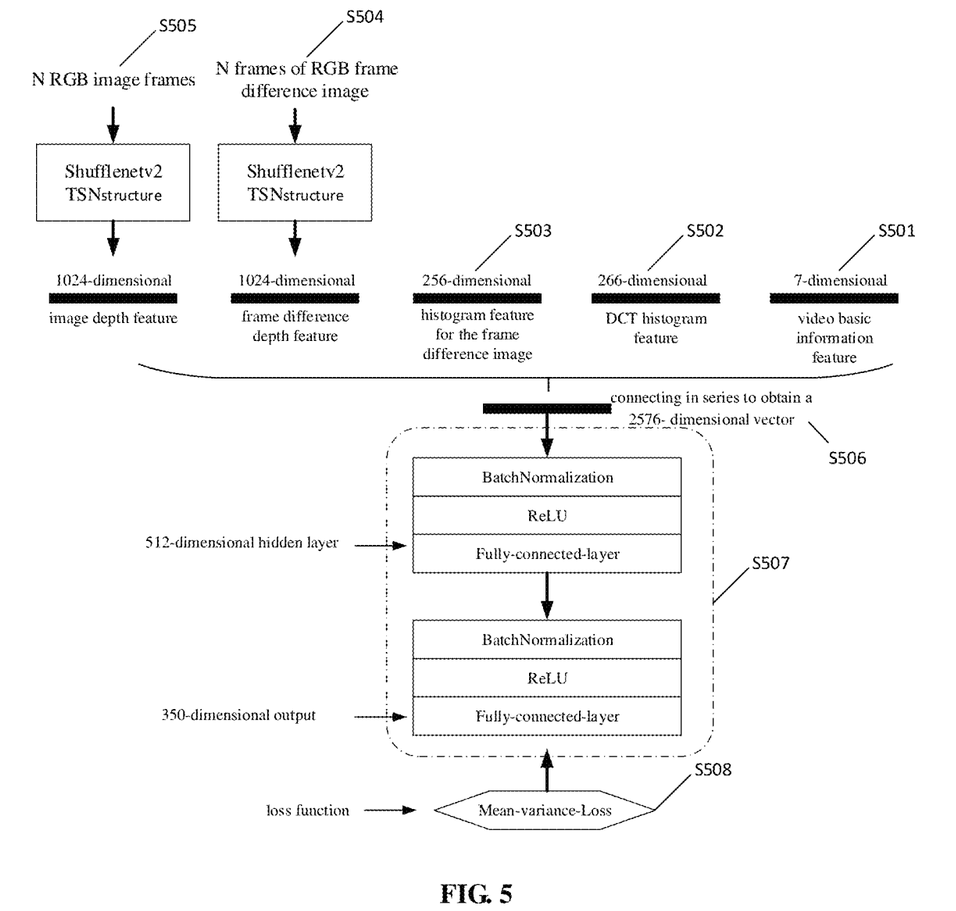
FIG. 5 shows an exemplary diagram of a training method of a coding complexity prediction model according to the embodiment of the present invention.

In an example, as shown in FIG. 5, the training process of the coding complexity prediction model in the embodiment of the present application may include steps from S501 to S505:

S501, acquiring a 7-dimensional video basic information feature (attribute feature) from the second sample video;

S502, acquiring a 266-dimensional DCT histogram feature of the second sample video (the transforming histogram feature);

S503, acquiring a 256-dimensional frame difference histogram feature of the second sample video;

S504, acquiring N frames of RGB frame difference image (the second frame difference image) based on the second sample video, and inputting the N frames of RGB frame difference image into the TSN model (the frame difference deep learning model) by using Shuffle Net v2 as a basic network, and extracting the output of the last fully-connected layer of the frame difference deep learning model to acquire the 1024-dimensional frame difference depth feature;

S505, acquiring N RGB image frames (the second target image) based on the second sample video, and inputting the N RGB image frames into the TSN model (the image deep learning model) by using Shuffle Net v2 as a basic network, and extracting the output of the last fully-connected layer of the image deep learning model to acquire the 1024-dimensional image depth feature;

S506, connecting the 7-dimensional video basic information feature, the 266-dimensional DCT histogram feature, the 256-dimensional frame difference histogram feature, the 1024-dimensional frame difference depth feature, and the 1024-dimensional image depth feature in series to acquire a feature represented by a 2576-dimensional vector;

S507, inputting the 2576-dimensional vector feature of the second sample video into the MLP model, where the MLP model may be divided into two layers, and each layer of the MLP may be composed of a batch normalization layer, an activation function layer and the fully-connected layer; an output of the fully-connected layer of the first layer is used as a hidden layer (512 dimensions), and the fully-connected layer of the second layer outputs a 350-dimensional vector;

S508, learning a parameter with the back propagation algorithm by using the mean-variance loss as the loss function and the BPP true value as a target.

S501 to S508 is performed based on a large number of the second sample videos to acquire the trained coding complexity prediction model.

In the method for predicting a video coding complexity of the embodiment of the present application, the attribute feature of the target video and the histogram feature of the frame difference image can be input into the coding complexity prediction model to acquire the BPP prediction value of the target video, so that the suitable transcoding strategy is designed and used for transcoding compression according to the BPP prediction value. Further, the BPP prediction value is acquired based on the trained coding complexity prediction model, and the feature input into a coding complexity model includes both the attribute feature of the target video and the histogram feature for the frame difference image of the target video, so that the acquired BPP predictions are more accurate and predictions are more intelligent. Moreover, the feature input into the coding complexity model may include the transforming histogram feature and/or the image depth feature and/or the frame difference depth feature of the target video, which may further improve the accuracy of the BPP prediction value.

Figure 6:
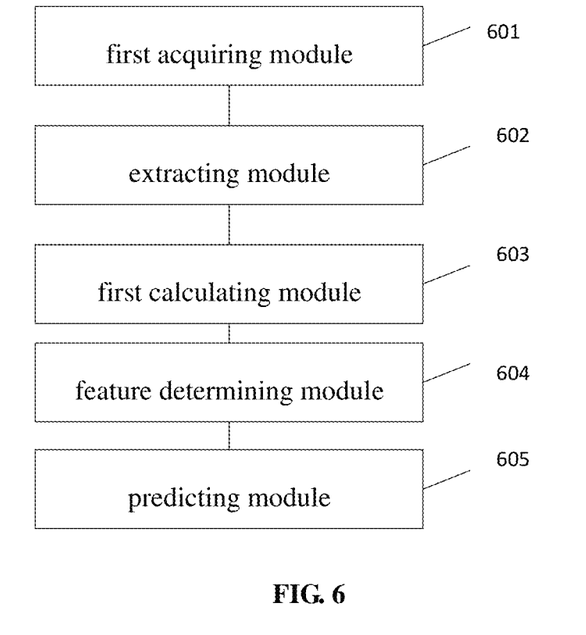
FIG. 6 shows a structural block diagram of a device for predicting video coding complexity according to an embodiment of the present application.

FIG. 6 shows a result block diagram of a device for predicting a video coding complexity according to an embodiment of the present application. The device includes:

a first acquiring module 601 configured to acquire an attribute feature of a target video;

an extracting module 602 configured to extract a plurality of first target image frames from the target video;

a first calculating module 603 configured to perform a frame difference calculation on the plurality of the first target image frames, to acquire a plurality of first frame difference images;

a feature determining module 604 configured to determine a histogram feature for frame difference images of the target video according to a statistical histogram of each first frame difference image; and a predicting module 605 configured to input a plurality of features of the target video into a coding complexity prediction model to acquire a coding complexity prediction value of the target video, where the plurality of features of the target video comprise the attribute feature of the target video and the histogram feature for frame difference images of the target video.

In an embodiment, the extracting module 902 may include:

a first extracting sub-module configured to extract V image frames from the target video according to a preset frames per second;

a first dividing sub-module configured to divide the V image frames into N segments of image stream according to a playing sequence the V image frames in the target video; and a second extracting sub-module configured to extract K image frames from each segment of image stream to acquire the plurality of first target image frames; where V, N, and K are positive integers, and K is less than V.

In an embodiment, the first calculating module 903 may include:

a first calculating sub-module configured to perform the frame difference calculation on two adjacent image frames of the K image frames in each segment of image stream, to acquire a first frame difference image.

In an embodiment, the feature determining module 604 may include:

a vector acquiring sub-module configured to draw a statistical histogram for each first frame difference image to acquire a plurality of histogram vectors for respective frame difference images; and an averaging sub-module configured to average the plurality of histogram vectors to acquire the histogram feature of the frame difference images.

Figure 7:
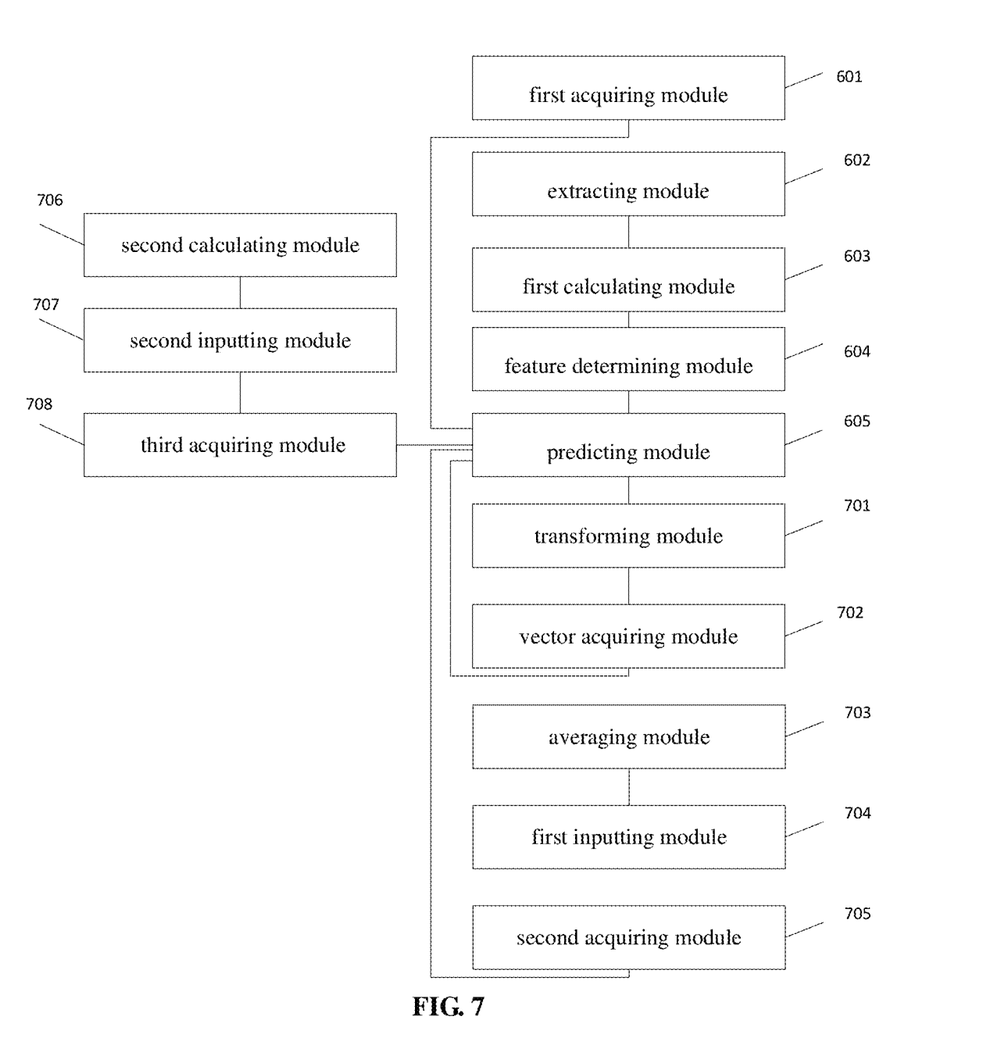
FIG. 7 shows a structural block diagram of a device for predicting a video coding complexity in an implementation according to an embodiment of the present application.

In an embodiment, the plurality of features of the target video further comprise a transforming histogram feature, and as shown in FIG. 7, the device further includes:

a transforming module 701 configured to perform a discrete cosine transform for each of the first frame difference images to acquire a plurality of spectrograms for respective first frame difference images;

a vector acquiring module 702 configured to draw a statistical histogram for each spectrogram to acquire a plurality of histogram vectors for respective spectrograms; and an averaging module 703 configured to average the plurality of histogram vectors for the respective spectrograms to acquire the transforming histogram feature.

In an embodiment, the plurality of features of the target video further include an image depth feature and the device further includes:

a first inputting module 704 configured to input a plurality of second target image frames extracted from the target video into an image deep learning model;

a second acquiring module 705 configured to acquire an intermediate layer result of the image deep learning model in response to an input of the plurality of frames of second target image, to acquire the image depth feature;

a second calculating module 706 configured to perform a frame difference calculation on the plurality of third target image frames extracted from the target video, to acquire a plurality of second frame difference images;

a second inputting module 707 configured to input the plurality of second frame difference images into a frame difference deep learning model; and a third acquiring module 708 configured to acquire an intermediate layer result of the frame difference deep learning model in response to an input of the plurality of second frame difference images, to acquire the frame difference depth feature.

In an embodiment, the device further includes:

a sample image extracting module configured to extract a plurality of sample image frames from a first sample video; and a first training module configured to train a temporal segment network by using the plurality of sample image frames as inputs and using a true value of the coding complexity of the first sample video as a target, to acquire the image deep learning model.

In an embodiment, the device further includes:

a fourth acquiring module configured to perform a frame difference calculation on the plurality of sample image frames, to acquire a plurality of sample frame difference images; and a second training module configured to train a temporal segment network by using the plurality of sample frame difference images as inputs and using a true value of the coding complexity of the first sample video as a target, to acquire the frame difference deep learning model.

In an embodiment, the second acquiring module 704 includes:

a third extracting sub-module configured to extract V image frames from the target video according to a preset frames per second, where V is a positive integer;

a second dividing sub-module, configured to divide the V image frames into N segments of image stream according to a playing sequence of the V image frames in the target video;

a fourth extracting sub-module configured to extract one image frame from each segment of image stream, to acquire N second target image frames; and an inputting sub-module configured to input the N second target image frames into the image deep learning model.

In an embodiment, the second calculating module 706 includes:

a fifth extracting sub-module configured to extract V image frames from the target video according to a preset frames per second, where V is a positive integer;

a third dividing sub-module configured to divide the V image frames into N segments of image stream according to a playing sequence of the V image frames in the target video; and a second calculating sub-module configured to extract two image frames from each segment of image stream and calculating a frame difference between the two image frames of each segment of image stream, to acquire N second frame difference images.

Figure 8:
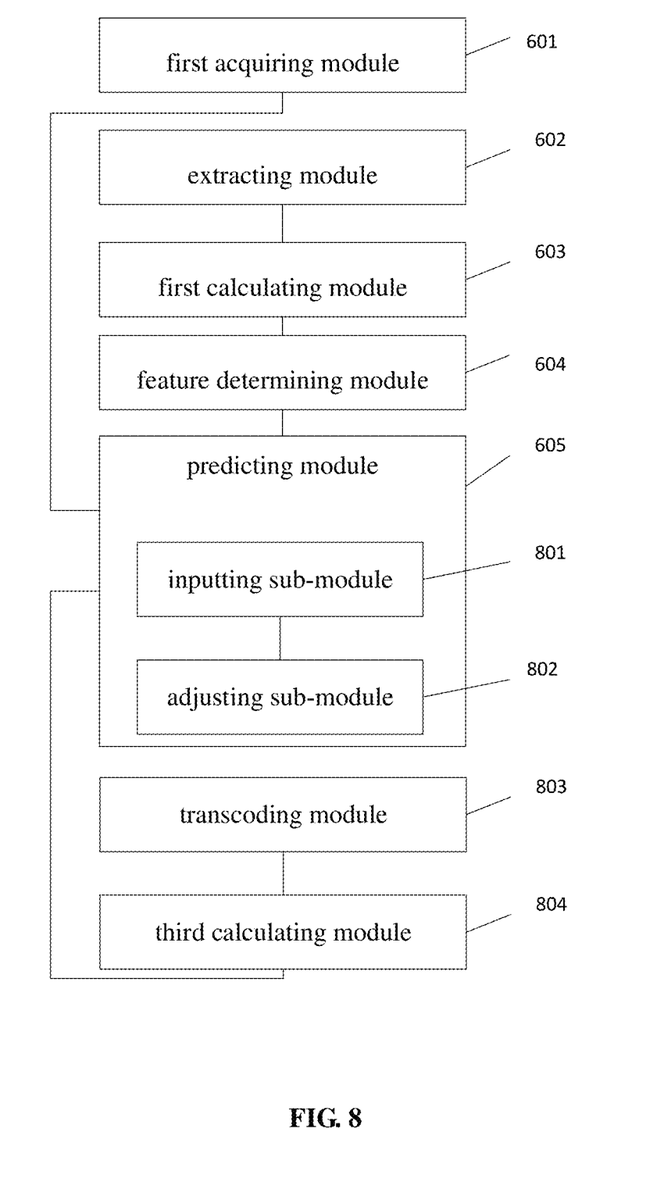
FIG. 8 shows a structural block diagram of a device for predicting a video coding complexity in another implementation according to an embodiment of the present application.

In an embodiment, the target video includes a second sample video, and during training the coding complexity prediction model, as shown in FIG. 8, the predicting module 605 includes:

an inputting sub-module 801 configured to input features of a plurality of second sample videos into a multi-layer perception model to acquire a plurality of coding complexity prediction values of the respective second sample videos; and an adjusting sub-module 802 configured to, according to a plurality of coding complexity true values and the plurality of coding complexity prediction values, adjust the multi-layer perception model to acquire the coding complexity prediction model.

In an embodiment, as shown in FIG. 8, the device further includes:

a transcoding module 803 configured to transcode the second sample videos according to a preset coding parameter; and a third calculating module 804 configured to calculate a coding complexity value of the transcoded second sample video to acquire the coding complexity true value.

In this embodiment, functions of modules in the device refer to the corresponding description of the above mentioned method and thus the description thereof is omitted herein.

Figure 9:
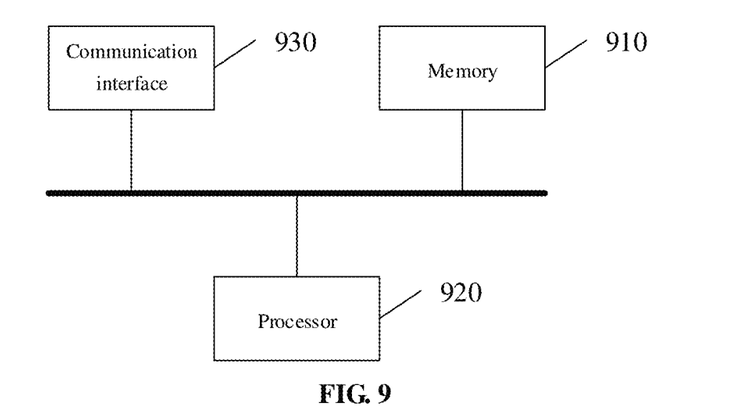
FIG. 9 shows a structural block diagram of an apparatus for predicting a video coding complexity according to an embodiment of the present application.

FIG. 9 shows a structural diagram of a prediction apparatus for video coding complexity of the embodiment of the application. As shown FIG. 9, the apparatus includes a memory 901 and a processor 902. The memory 901 stores a computer program executable on the processor 902. When the processor 902 executes the computer program, the prediction method for video coding complexity in the foregoing embodiment is implemented. The number of the memory 901 and the processor 902 may be one or more.

The apparatus further includes:

a communication interface 903 configured to communicate with an external device and exchange data.

The memory 901 may include a high-speed RAM memory and may also include a non-volatile memory, such as at least one magnetic disk memory.

If the memory 901, the processor 902, and the communication interface 903 are implemented independently, the memory 901, the processor 902, and the communication interface 903 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 9, but it does not mean that there is only one bus or one type of bus.

Optionally, in a specific implementation, if the memory 901, the processor 902, and the communication interface 903 are integrated on one chip, the memory 901, the processor 902, and the communication interface 903 may implement mutual communication through an internal interface.

According to an embodiment of the present application, a computer-readable storage medium is provided for storing computer software instructions, which include programs involved in execution of the above prediction method for video coding complexity.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "multiple" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically acquire the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for predicting a video coding complexity, comprising:
   acquiring an attribute feature of a target video;
   extracting a plurality of first target image frames from the target video;
   performing a frame difference calculation on the plurality of the first target image frames, to acquire a plurality of first frame difference images;
   determining a histogram feature for frame difference images of the target video according to a statistical histogram of each first frame difference image; and
   inputting a plurality of features of the target video into a coding complexity prediction model to acquire a coding complexity prediction value of the target video, wherein the plurality of features of the target video comprise the attribute feature of the target video and the histogram feature for frame difference images of the target video,
   wherein extracting the plurality of first target image frames from the target video comprises:
   extracting V image frames from the target video according to a preset frames per second;
   dividing the V image frames into N segments of image stream according to a playing sequence the V image frames in the target video; and
   extracting K image frames from each segment of image stream to acquire the plurality of first target image frames;
   wherein V, N, and K are positive integers, and K is less than V.

2. The method according to claim 1, wherein the performing a frame difference calculation on the plurality of first target image frames, to acquire a plurality of first frame difference images comprises:
   performing the frame difference calculation on two adjacent image frames of the K image frames in each segment of image stream, to acquire a first frame difference image.

3. The method according to claim 1, wherein the determining a histogram feature for frame difference images of the target video according to a statistical histogram of each first frame difference image comprises:
   drawing a statistical histogram for each first frame difference image to acquire a plurality of histogram vectors for respective frame difference images; and
   averaging the plurality of histogram vectors to acquire the histogram feature of the frame difference images.

4. The method according to claim 1, wherein the plurality of features of the target video further comprise a transforming histogram feature, and the method further comprises:
   performing a discrete cosine transform for each of the first frame difference images to acquire a plurality of spectrograms for respective first frame difference images;
   drawing a statistical histogram for each spectrogram to acquire a plurality of histogram vectors for respective spectrograms; and
   averaging the plurality of histogram vectors for the respective spectrograms to acquire the transforming histogram feature.

5. The method according to claim 1, wherein the plurality of features of the target video further comprise an image depth feature and a frame difference depth feature, and the method further comprises:

inputting a plurality of second target image frames extracted from the target video into an image deep learning model;

acquiring an intermediate layer result of the image deep learning model in response to an input of the plurality of frames of second target image, to acquire the image depth feature;

performing a frame difference calculation on the plurality of third target image frames extracted from the target video, to acquire a plurality of second frame difference images;

inputting the plurality of second frame difference images into a frame difference deep learning model; and acquiring an intermediate layer result of the frame difference deep learning model in response to an input of the plurality of second frame difference images, to acquire the frame difference depth feature.

6. The method according to claim 5, further comprising:
extracting a plurality of sample image frames from a first sample video; and
training a temporal segment network by using the plurality of sample image frames as inputs and using a true value of the coding complexity of the first sample video as a target, to acquire the image deep learning model.

7. The method according to claim 5, further comprising:
extracting a plurality of sample image frames from a first sample video;
performing a frame difference calculation on the plurality of sample image frames, to acquire a plurality of sample frame difference images; and
training a temporal segment network by using the plurality of sample frame difference images as inputs and using a true value of the coding complexity of the first sample video as a target, to acquire the frame difference deep learning model.

8. The method according to claim 5, wherein the inputting a plurality of second target image frames extracted from the target video into an image deep learning model comprises:
extracting V image frames from the target video according to a preset frames per second, wherein V is a positive integer;
dividing the V image frames into N segments of image stream according to a playing sequence of the V image frames in the target video;
extracting one image frame from each segment of image stream, to acquire N second target image frames; and
inputting the N second target image frames into the image deep learning model.

9. The prediction method according to claim 5, wherein the performing a frame difference calculation on the plurality of third target image frames extracted from the target video, to acquire a plurality of second frame difference images comprises:
extracting V image frames from the target video according to a preset frames per second, wherein V is a positive integer;
dividing the V image frames into N segments of image stream according to a playing sequence of the V image frames in the target video; and
extracting two image frames from each segment of image stream and calculating a frame difference between the two image frames of each segment of image stream, to acquire N second frame difference images.

10. The method according to claim 1, wherein the target video comprises a second sample video; and during training the coding complexity prediction model, inputting a plurality of features of the target video into a coding complexity prediction model to acquire a coding complexity prediction value of the target video comprises:
inputting features of a plurality of second sample videos into a multi-layer perception model to acquire a plurality of coding complexity prediction values of the respective second sample videos; and
according to a plurality of coding complexity true values and the plurality of coding complexity prediction values, adjusting the multi-layer perception model to acquire the coding complexity prediction model.

11. The method according to claim 10, further comprising:
transcoding the second sample video according to a preset coding parameter; and
calculating a coding complexity value of the transcoded second sample video to acquire the coding complexity true value.

12. A device for predicting a video coding complexity, comprising:
one or more processors; and
a storage device configured for storing one or more programs, wherein
the one or more programs are executed by the one or more processors to enable the one or more processors to:
acquire an attribute feature of a target video;
extract a plurality of first target image frames from the target video;
perform a frame difference calculation on the plurality of the first target image frames, to acquire a plurality of first frame difference images;
determine a histogram feature for frame difference images of the target video according to a statistical histogram of each first frame difference image; and
input a plurality of features of the target video into a coding complexity prediction model to acquire a coding complexity prediction value of the target video, wherein the plurality of features of the target video comprise the attribute feature of the target video and the histogram feature for frame difference images of the target video,
wherein to extract the plurality of first target image frames from the target video, the one or more processors are further configured to:
extract V image frames from the target video according to a preset frames per second;
divide the V image frames into N segments of image stream according to a playing sequence the V image frames in the target video; and
extract K image frames from each segment of image stream to acquire the plurality of first target image frames;
wherein V, N, and K are positive integers, and K is less than V.

13. The device according to claim 12, wherein the plurality of features of the target video further comprise a transforming histogram feature, and the one or more programs are executed by the one or more processors to enable the one or more processors further to:
perform a discrete cosine transform for each of the first frame difference images to acquire a plurality of spectrograms for respective first frame difference images;
draw a statistical histogram for each spectrogram to acquire a plurality of histogram vectors for respective spectrograms; and
average the plurality of histogram vectors for the respective spectrograms to acquire the transforming histogram feature.

14. The device according to claim 12, wherein the plurality of features of the target video further comprise an image depth feature and a frame difference depth feature, and the one or more programs are executed by the one or more processors to enable the one or more processors further to:
- input a plurality of second target image frames extracted from the target video into an image deep learning model;
- acquire an intermediate layer result of the image deep learning model in response to an input of the plurality of frames of second target image, to acquire the image depth feature;
- perform a frame difference calculation on the plurality of third target image frames extracted from the target video, to acquire a plurality of second frame difference images;
- input the plurality of second frame difference images into a frame difference deep learning model; and
- acquire an intermediate layer result of the frame difference deep learning model in response to an input of the plurality of second frame difference images, to acquire the frame difference depth feature.

15. The device according to claim of 12, wherein the target video comprises a second sample video, and during training the coding complexity prediction model, the one or more programs are executed by the one or more processors to enable the one or more processors further to:
- input features of a plurality of second sample videos into a multi-layer perception model to acquire a plurality of coding complexity prediction values of the respective second sample videos; and
- according to a plurality of coding complexity true values and the plurality of coding complexity prediction values, adjust the multi-layer perception model to acquire the coding complexity prediction model.

16. The device according to claim 15, wherein the one or more programs are executed by the one or more processors to enable the one or more processors further to:
- transcode the second sample video according to a preset coding parameter; and
- calculate a coding complexity value of the transcoded second sample video to acquire the coding complexity true value.

17. A non-transitory computer-readable storage medium, in which a computer program is stored, wherein the computer program, when executed by a processor, implements the method of claim 1.

* * * * *